United States Patent

Soules

Patent Number: 6,087,588
Date of Patent: Jul. 11, 2000

[54] ACTIVE COVER PLATE FOR AN ELECTRICAL OUTLET

[75] Inventor: Jack Arbuthnott Soules, Shaker Heights, Ohio

[73] Assignee: Technical Systems Corp., Cleveland, Ohio

[21] Appl. No.: 09/024,418

[22] Filed: Feb. 17, 1998

[51] Int. Cl.[7] .................................................. H02G 3/14
[52] U.S. Cl. ............................ 174/66; 220/3.8; 220/241
[58] Field of Search .............................. 174/66; 220/241, 220/3.8

[56] References Cited

U.S. PATENT DOCUMENTS

| | | | |
|---|---|---|---|
| D. 141,030 | 4/1945 | Wheeler, Jr. .............................. D26/13 |
| 2,015,698 | 10/1935 | Tiffany .................................. 174/66 X |
| 2,428,167 | 9/1947 | Linton .................................. 220/241 X |
| 2,575,820 | 11/1951 | Linton .................................. 220/241 X |
| 2,934,590 | 4/1960 | Thompson et al. .................... 174/66 X |
| 3,522,595 | 8/1970 | White .................................... 174/66 X |
| 3,680,237 | 8/1972 | Finnerty, Sr. ......................... 40/130 M |
| 3,859,454 | 1/1975 | Mann ......................................... 174/66 |
| 4,282,591 | 8/1981 | Andreuccetti .......................... 174/66 X |
| 4,534,486 | 8/1985 | Eidson .................................... 220/241 |
| 5,485,356 | 1/1996 | Nguyen ................................. 174/66 X |

*Primary Examiner*—Dean A. Reichard
*Attorney, Agent, or Firm*—Alfred D. Lobo

[57] ABSTRACT

An active cover plate is provided for a standard electrical device such as a switch or receptacle which has a body unit-molded from a synthetic resin. The active cover plate is so termed because an active load is embedded within it. The exterior of the body is provided with at least a pair of terminals for connection to a building's current supply. A pair of opposed spring-strips embedded in the plate are positioned so as to protrude rearward from the plate and contact terminals on the device. The spring-strips are connected to terminals of the active load. Contact of the spring-strips against the terminals is good enough to provide the active load with the current it needs. The active load may be an electroluminescent panel, or a radio transmitter, or receiver, or any other device which consumes less than about 25 watts, and the components of which can be sandwiched within the plate.

10 Claims, 4 Drawing Sheets

ACTIVE COVER PLATE FOR AN ELECTRICAL OUTLET

FIELD OF THE INVENTION

This invention relates generally to a cover plate of dielectric material which is converted to an "active" cover plate by connecting it to a source of electric current through "live" terminals of a commercially available standard electrical device such as a common switch or wall receptacle, or combination thereof. The term "standard" refers to devices deemed standard by the National Electrical Code published by National Fire Protection Association, and as revised from time to time, and referred to in Guide to the 1975 National Electrical Code by Roland E. Palmquist, Publisher Howard W Sams, Indianapolis, Ind. (1975).

An "active" cover plate is defined as one to which electrical power is directly supplied for use therein, that is, the plate consumes power. The active cover plate is fitted to an installed device without modifying or interfering with the existing wiring, and without being plugged into the device's body. Each cover plate has embedded or sandwiched in it a "load" and associated circuit components. More particularly, the invention relates to a cover plate in which the embedded load is an electroluminescent panel; by its electroluminescence the plate indicates that the device (whether switch or receptacle) is connected to a source of current, that is, energized. In another embodiment the invention relates to an active cover plate which is not electroluminescent, but supplies enough current to the "load" which is integral with and "slaved" to the cover plate which itself functions, for example, as a radio transmitter or receiver; and, in yet another embodiment, an active cover plate is both electroluminescent and a transmitter or receiver, that is, the plate simultaneously provides enough power for the load which includes plural functional components.

BACKGROUND OF THE INVENTION

Lighting devices which produce diffused light at relatively low intensity to provide sufficient visible light useful for human eyes to discern objects in the dark, are extensively used where low-level lighting is desirable. In particular, an electroluminescent cover plate is routinely used as a night-light over a conventional electrical receptacle, typically a duplex wall receptacle (using one of the two available plug-in portions or sockets) or over a receptacle which may include a light switch in a bathroom or bedroom (using the only available socket). A commercially available night-light, such as one sold under the trademark Limelites by Austin Innovations as Model No. 11100, may be plugged into the socket of a conventional wall receptacle. The popularity of the electroluminescent cover plate derives from its inherently "fail-safe" construction, and its ability to operate continuously for an arbitrarily long time, producing a subdued lighting.

In U.S. Pat. No. 3,588,489 to Gaines there is illustrated an electroluminescent panel between dual receptacles in a unique body case which houses three sets of opposed contact slots separated by a pair of vertically grooved transverse ribs. The panel is centered between openings for prongs to be plugged into the corresponding receptacle beneath the cover which is an application-specific cover plate for a wall-mounted duplex receptacle. The cover has a pair of opposed prongs which are inserted in opposed contact slots to provide current to the panel.

A few years later U.S. Pat. No. 3,307,030 to DeFrancisco disclosed an electroluminescent cover plate which provided plug apertures or a slot for a switch handle, but required that the plate have a pair of prongs which were to be plugged into a plug-in receptacle which required an extra central plug-in portion into which the prongs could be plugged into.

Very recently, in U.S. Pat. No. 5,485,356, Nguyen teaches a cover plate for a duplex receptacle, and to the rear surface of the plate is secured a resilient and flexible U-shaped conductive strip the arms of which provide contact plates which are inserted into contact members on each side of the body of the receptacle. The purpose of the device is to energize an indicator light when the receptacle is energized. The cover plate itself is not active and relies on the indicator light to indicate whether the receptacle is energized.

SUMMARY OF THE INVENTION

It has been discovered that a pair of electrically conductive biasing means such as contacting spring-strips secured within a synthetic resinous ("plastic") cover plate and in electrical contact with a load secured therein, provides adequate electrical contact to permit the use of the cover plate as an "active" plate which simply and inexpensively accomplishes any one or more of several desirable functions. The circuit is secured to the cover plate in a manner so as to preclude human contact with a component of said circuit capable of inflicting a shock. Most preferably the circuit is embedded or sandwiched within the cover plate, transforming the cover plate into an "active device".

Accordingly an active cover plate is provided for a standard electrical device having a unit-molded body on the exterior of which at least a pair of terminals is adapted for connection to a source of electrical current, without modifying the device's body, and without interfering with the wiring of the device (whether switch or receptacle, or combination thereof) after it is installed. The circuit includes a "load" supplied with enough power through contact with a pair of biasing contact means, each adapted to contact one of the terminals disposed exteriorly of the body of the electrical device. The contact resistance between the biasing means and the terminals is not important because the power requirement of the load is small.

In a specific embodiment, the load in an active cover plate is an electroluminescent material and the synthetic resinous material is preferably translucent or sufficiently transparent to allow illumination from the panel to be seen. When the cover plate is installed on a common and commercially available electrical device (switch or wall receptacle) the plate is illuminated continuously, while also indicating that the device is energized. Installation of the active cover plate does not require plugging the cover plate into the body of the device. The spring-strips, or equivalent contact means, contact the heads of screws on terminals supplying current on one or the other side of the body of the receptacle, or both sides; the screws are used to provide connection to available current supply leads. A wall receptacle has at least one plug-in socket opening forwardly thereof for receiving connecting prongs of a plug, to connect an electrical appliance or other device with a source of potential.

It has further been discovered that contacts such as spring-strips on the rear surface of an insulating cover plate for a standard device, provide good enough contact to transmit enough current to the electrodes of a luminescent panel, not only to generate luminescence in the cover pit also to power any low voltage, low power (less than about 25 watts) electronic device small enough to be accomodated within the confines of a cover plate which is preferably not more than 10 mm thick; but the contacts do not provide enough power to present a danger to a human who comes in contact with the active late. If desired the entire cover plate may be formed from an electroluminescent material, and electrodes for the material are connected to the opposed spring-strips.

Where the luminescence is not required, the active cover plate may be made from a conventional non-electroluminescent material, and electrodes for Such a cover plate itself functions as a radio transmitter activated by a microphone; or, as a radio receiver which picks up a signal either from the ambient surroundings or from AC lines conducting current for the household or building supply. The receiver actuates a miniature loudspeaker integral with the cover plate.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Buildings have wall switches and wall receptacles into which a wide variety of appliances or floor lamps and the like, may be plugged, to receive electrical current. The wall switches typically supply current to ceiling lights, outdoor lights, ceiling fans, etc. Such commercially available switches (e.g. single pole Leviton 1451-I) and wall receptacles (e.g. Leviton 5320-I for three-pronged, and 223-I for two-pronged plugs), and combinations thereof (e.g. Leviton 5225-I) are permanently connected to the incoming electrical supply, usually 120 V or 220 V AC. The cover plates of this invention are adapted to be fitted over such electrical devices, replacing conventional cover plates and automatically placing the cover plate in electrical communication with a pair of terminals for the live wires without in any way modifying the conventional electrical device whether it is a switch or a receptacle. It is desirable to find a switch or receptacle in the dark, particularly in a strange room. It is also desirable to avoid giving up the use of one receptacle in a duplex receptacle for purposes other than to plug in an electroluminescent panel, solely because one needs light to see the other receptacle.

Figure 1:
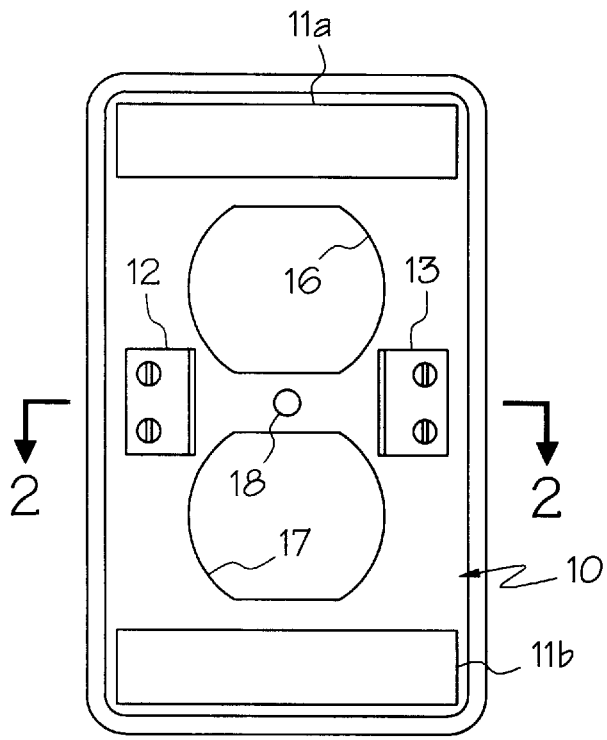
FIG. 1 is a rear view of an active cover plate for twin plug-in sockets in a standard duplex receptacle, the cover plate having an electroluminescent panel embedded therein.
Figure 2:
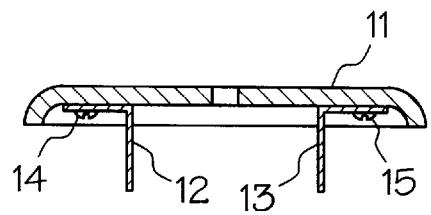
FIG. 2 is an enlarged cross-sectional view taken along the line 2—2 in FIG. 1.

Referring to FIGS. 1 and 2, numeral 10 refers to a translucent synthetic resinous ("plastic") cover plate in which is visible one or more electroluminescent plates 11a, 11b molded within it. If only one, it may occupy only the top, as indicated by 11a, or the bottom portion of the cover plate, as indicated by 11b; and for more light, both the top and the bottom. A pair of opposed right-angled electrically conducting spring-strips 12, 13 are secured, one on each side of the vertical central axis of the cover plate 10 with securing means such as rivets or screws 14, 15 which place electrodes of the panels in contact with a source of electric current, typically 120 volts or 220 volts AC. Preferably the ends of the rivets 14, 15 are embedded in the cover plate (as shown) and do not protrude from the face thereof. Most preferably the electroluminescent plates 11a, 11b are laminated between a pair of congruent translucent plates of synthetic resin such as Lexan® polycarbonate. The plate is self-limiting in the amount of current it draws depending upon the plate's area and the frequency of the AC supply. For ordinary buildings such as residences, office complexes, warehouses, workplaces in assembly plants, and the like, where current is supplied at from about 120 volts to 240 volts AC, the current drawn by the plate is limited in the range from about 1 to about 100 milliamps. The active cover plate is an effective insulator against transmitting a shock to human beings; if the ends of the screws 14, 15 are allowed to protrude, then those ends are insulated from the plate 10 with appropriate insulating means such as insulating washers (not shown).

Figure 3:
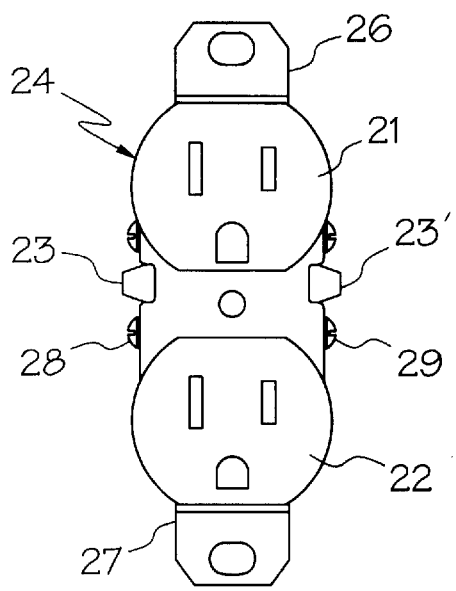
FIG. 3 is a front view of a conventional plug-in duplex receptacle to which the active cover plate is attached without being plugged into the duplex receptacle's body.

In the particular embodiment illustrated, cover plate 10 has a pair of longitudinally spaced apart apertures 16, 17 correspondingly sized and shaped to receive the sockets 21, 22 which are off-set from its body 24 (by the thickness of the cover plate 11) of a duplex receptacle 20 illustrated in FIG. 3. Other standard cover plates may have only one or several openings through which a plug for the cord of an electrical appliance may be inserted, to connect it to the source of power. The body 24 is a one-piece molding of insulating material configured as a standard duplex receptacle and provided with a threaded bore 25 to receive a screw (not shown) slid through aperture 18 in the cover plate to secure it to the body; and, the body is provided with mounting ears 26, 27 for mounting the body in a wall box (not shown). The sockets 21, 22 are shown without an opening for a neutral prong which opening may also be provided in another standard duplex receptacle. Accordingly, only twin screws 28 for connecting the power lead, and twin screws 29 for connecting the neutral lead of a conventional 120 volt AC current supply are shown. Each set of twin screws is conventionally connected with an electrically conducting connecting strip having laterally projecting tabs 23, 23' respectively which are part of the current supply fastening means, to connect the sockets of the receptacle with the source of electrical current.

Referring further to FIG. 2, the section through the spring-strips 12 and 13 shows the strips are wide enough to contact both screws 14 and 15 respectively on either side, ensuring that each spring-strip contacts at least one screw on each side. The spring-strips are preferably made from a copper alloy having a high spring constant and each is positioned so as to contact the fastening means whether it is the upper surface of at least one of the twin screws 28, 29 on each side, or a tab 23, 23' of the connecting strip connecting each set of twin screws. The panels 11a, 11b are illuminated as soon as the spring-strips make contact with the terminals.

An electroluminescent panel 11a, 11b typically comprises a multilayer assembly having planar electrodes across a dielectric, e.g. a phosphor-containing synthetic resinous or ceramic material in which excitable phosphors are distributed so that application of an AC voltage to the electrodes produces a luminous glow. The construction of such electroluminescent panels is well known and forms no part of this invention. However, such conventional panels are provided with a pair of plug-in prongs (typically, folded-over conductive strips) which are received in a receptacle of the duplex receptacle. Thus, in a conventional electroluminescent cover plate for a duplex receptacle, one receptacle is used by the cover plate, leaving only one receptacle for its intended use.

Figure 4:
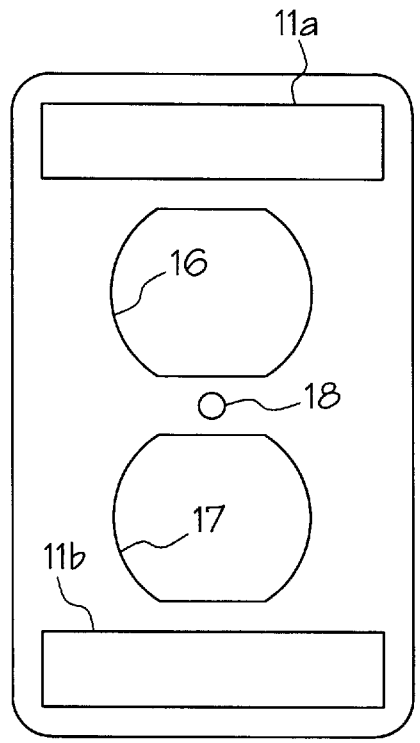
FIG. 4 is a front view of the active cover plate shown in FIG. 3.
Figure 5:
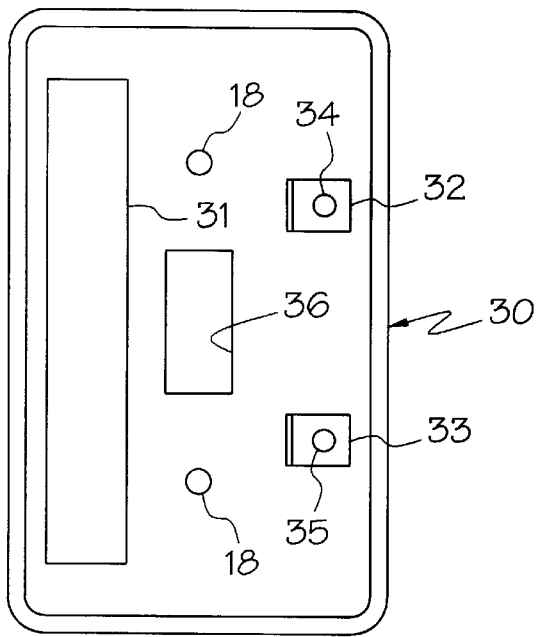
FIG. 5 is a rear view of an active cover plate for a standard switch, the cover plate having an electroluminescent panel embedded therein.
Figure 6:
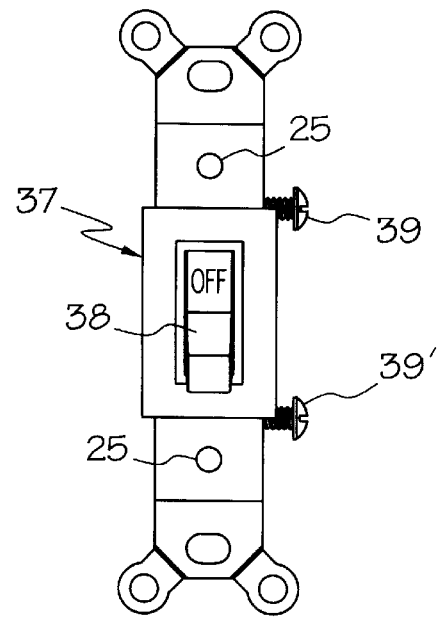
FIG. 6 is a front view of the standard switch.
Figure 7:
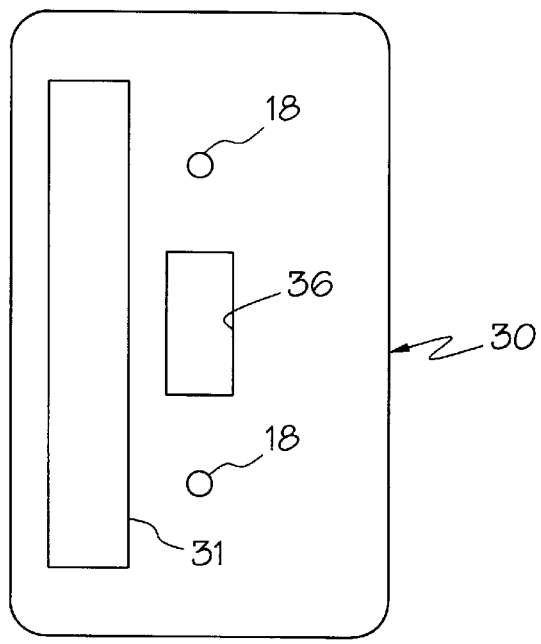
FIG. 7 is a front view of the active cover plate shown in FIG. 5.

An electroluminescent cover plate for a standard switch is not available because there is no easy and convenient way to connect such a plate to terminals on the body of such a switch. Referring to FIGS. 5, 6 and 7, there is shown an active cover plate 30 which comprises an electroluminescent panel 31 embedded in the side thereof, and a pair of opposed right-angled electrically conducting spring-strips 32, 33 secured on either side of the central horizontal axis of the cover plate 30, with securing means such as rivets or screws 34, 35, as before. To avoid embedding the panel, it may be secured to surface of the cover plate, preferably the front surface, and covered with a light-transmitting material which insulates a human against shock. However such mounting of the active load on the surface of the cover plate makes the load susceptible to damage when the load suffers an inadvertent impact from persons or articles passing too close to the electrical device. The cover plate is mounted to the switch with mounting screws through apertures 18. The spring-strips 34, 35 are positioned so as to bias them against terminals 39, 39' of a standard switch assembly 37. A central vertical slot 36 allows the handle 38 of the switch to be inserted through the slot. Electrodes from the panel 31 are connected to the rivets with copper wires and all are conveniently laminated, as in FIGS. 1, 2 & 4, between translucent plastic plates.

As is now evident the cover plate of this invention in one embodiment comprises an electroluminescent material, preferably in the form of a laminar synthetic resinous composite, and a pair of oppositely disposed spring-strips in electrical contact with the composite to provide direct contact with fastening means which connect a source of potential to the body of a switch or wall receptacle without the spring-strips being plugged into the body of either, the spring strips extending in a generally orthogonal direction from the rear of the cover plate and being secured thereto by securing means which ensure electrical connection between the spring-strips and the source of potential, but which securing means are insulated from the front face of the cover plate.

Figure 8:
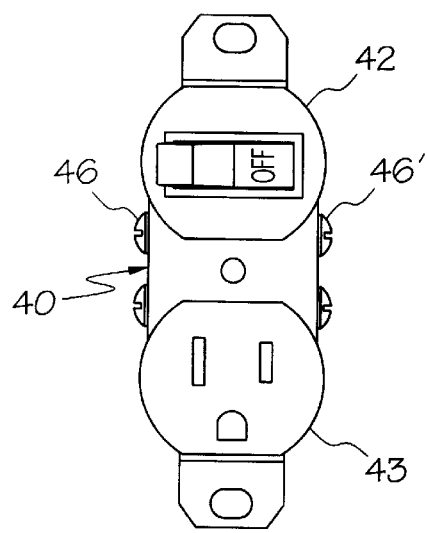
FIG. 8 is a front view of a standard combination switch and receptacle.

Schematically illustrated in FIG. 8 is a standard combination switch and receptacle 40 having a switch 42 and a receptacle 43. A switch 42 is typically used to turn on an incandescent or fluorescent light above a mirror, while the receptacle 43 is used to plug in an appliance such as an electric razor. At present, plugging in the prongs of a Limelite® electroluminescent panel into the receptacle 43 precludes using the socket for plugging in another appliance except through a triple-tap outlet or other adapter-plug. It is not desirable to use a triple-tap outlet plug in the available socket so as to plug an electroluminescent panel into a socket in the triple-tap outlet plug.

Figure 9:
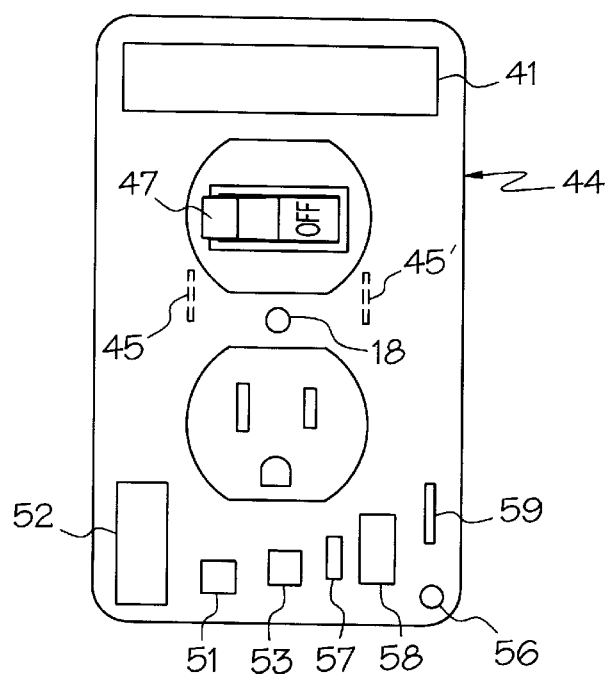
FIG. 9 is a front view of an active cover plate for the standard combination switch and receptacle shown in FIG. 8, the cover plate having not only an electroluminescent panel embedded therein, but also a circuit illustrated in FIG. 10, including a power consuming load such as components, illustrated in FIG. 11, for a transmitter embedded in the cover plate.

FIG. 9 schematically illustrates such a single-aperture cover plate 44, having an active circuit for a transmitter as well as an electroluminescent panel 41 embedded therein, and because the panel is always illuminated when the cover plate is positioned over the combination switch and receptacle 40, allows one to find the handle 47 of the switch 42 in the dark. The active plate 44 provides the power otherwise provided by a battery. In an embodiment analogous to that previously illustrated in FIG. 1, the cover plate 44 has a pair of horizontally opposed spring plates 45, 45' shown in phantom outline, protruding rearward on either side of the vertical axis through the cover plate, positioned to contact opposed terminals 46, 46' of the switch 42.

Figure 10:
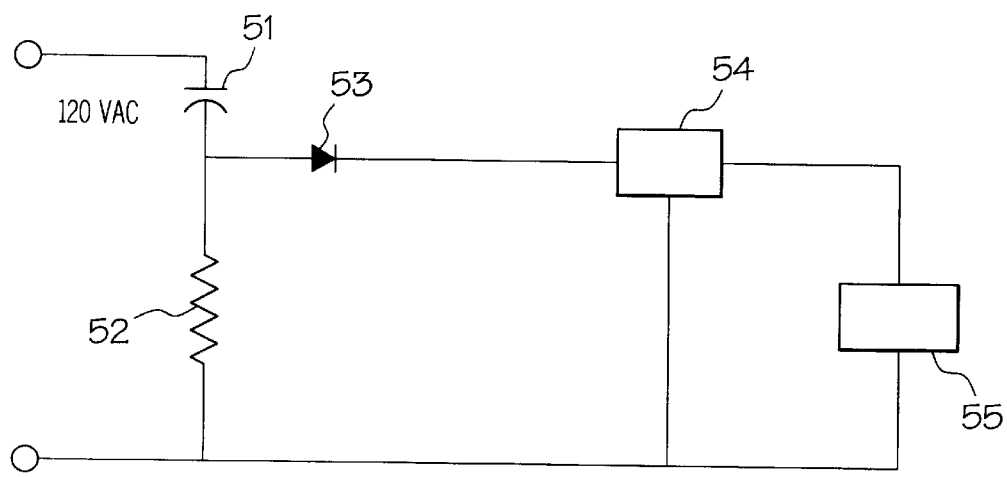
FIG. 10 is a diagrammatic representation of an electrical circuit for an active plate in which a load is integrated.

The embedded active circuit, schematically illustrated in FIG. 10, includes a desirable active device such as a transmitter or receiver. It is preferred to limit the power to the load by use of a capacitive divider, to prevent excessive heat build-up in the plate. The capacitive divider makes it unnecessary to use a bulky transformer to step down the voltage in the main supply line (120 V or 220 V AC). As before, the electrodes of the panel 41 are connected to terminals 45, 45' respectively, as are the terminals for the active circuit for the transmitter. The components of the circuit for the transmitter are sandwiched between plastic panels or otherwise embedded in plastic. These components include a capacitor 51 through which current is supplied, resistor 52 connected between terminals of a 120 V AC source, and a rectifier 53; the current which is filtered through a filter means 54 and flowed to a load 55 as shown in FIG. 10. Load 55 includes a LED 56, a miniature microphone 57, a transmitter 58 and a magnetic switch 59 to turn on the circuit. In a typical embodiment, the voltage used by the active element, whether transmitter or receiver and related components, or any other active element, consumes power in the range of from about 1 to about 10 watts.

The "load" is any device which can be integrated in the cover plate, typically by having the components of the load embedded between superimposed plastic plates. As an illustrative example, 1 $\mu$fd (microfarad) capacitor 51 provides about 2650 ohms impedance to limit the current (at 120 V) to 45 milliamps or less. The choice of resistor 52 ranges from about 75 ohms (which provides 3.4 volts) to about 150 ohms (to provide 6.8 volts). The power dissipated in 52 is typically in the range from about 150 to 300 milliwatts. Values of 51 and 52 can be chosen to be compatible with the load to make power dissipation as small as desired.

Typical loads are (a) a small FM transmitter and microphone; (b) a radio receiver and annunciator to respond to a door bell or a radio smoke alarm signal. The radio signal from the doorbell can be broadcast at low power on FM, or can s be transmitted at low frequency (150 KHz) over the existing power wiring. The doorbell or smoke detector switch activates a miniature oscillator putting out about 1 watt at 170 KHz. This signal is coupled to the AC wiring by a capacitor and can be detected throughout a building. The load is a miniature radio receiver tuned to 170 KHz. When a signal is detected at this frequency, the signal activates a piezoelectric buzzer in the cover plate. It is possible to have both the doorbell annunciator and the smoke alarm activated in the same circuit by choosing different radio frequencies for each. For example, the doorbell sounder could occur on 170 KHz and the smoke alarm oil 150 MHz. The receiver receives a signal generated elsewhere by a transmitter, typically up to 100 ft away, which transmitter is activated by a door bell or smoke alarm. As will be evident, the circuit illustrated in FIG. 10 shows the load which may be either a transmitter or a receiver depending on the circuitry and the antennae, and preferably the frequencies chosen for each will be different.

Instead of a transmitter or receiver the load may be an ultrasonic motion detector. The circuit elements embedded in the cover plate will included ultrasonic generator, and an ultrasonic receiver. The receiver is adjusted to detect any changes in the sound field and to sound an alarm when such change is detected.

Instead of an ultrasonic detector, the load may comprise a light source and photoelectric sensor which is directed to a mirror opposite the active cover plate, for example, across the room. Interruption of the light beam is detected by the sensor and sounds an alarm.

It will be evident to one skilled in the art that analogous circuits may be embedded in the cover plate to serve different functions, each circuit including a load and a combination of a resistor and capacitor and rectifier to produce an appropriate DC voltage and current preferably filtered to remove 60 and 120 Hz components. With sufficiently small and compact circuit elements more than one of the foregoing functions may be combined in a single cover plate.

Figure 11:
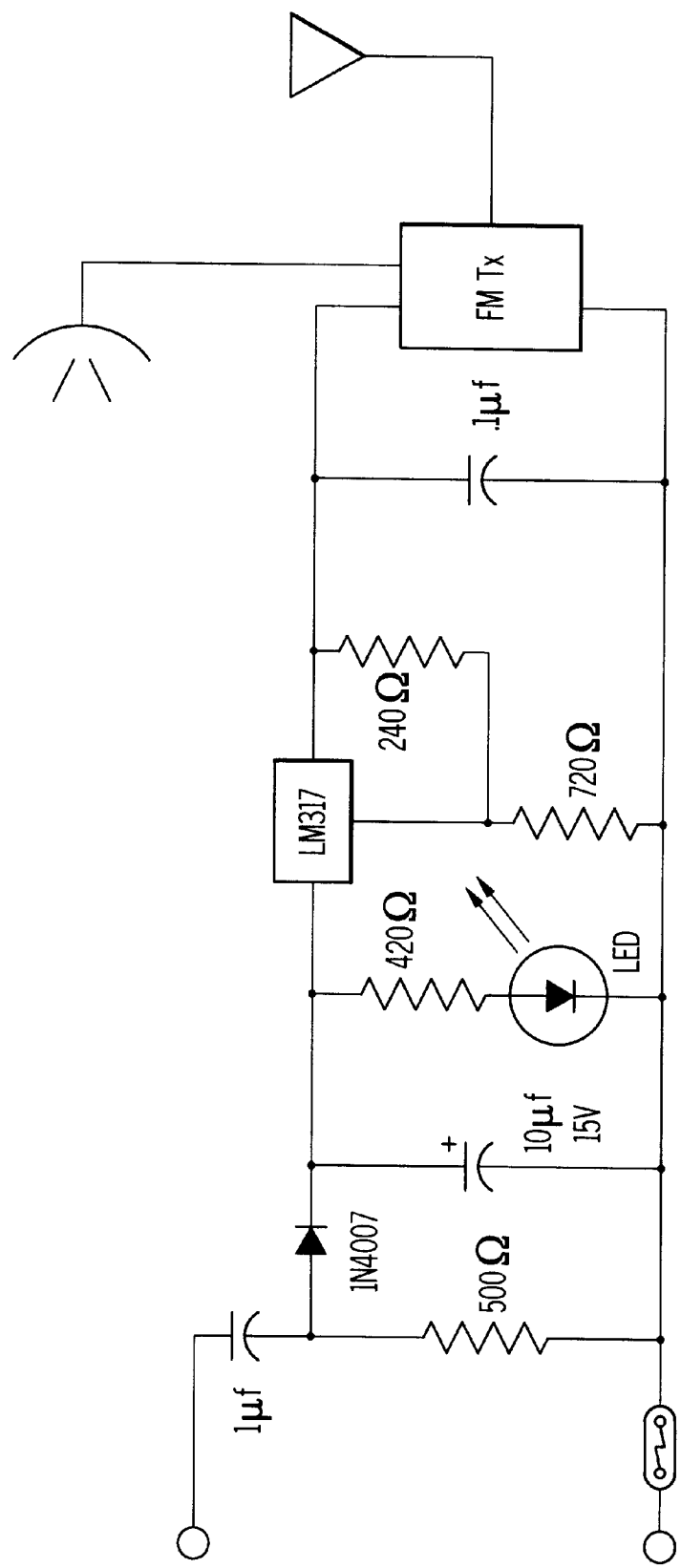
FIG. 11 is a diagrammatic representation of an electrical circuit for an active plate in which a load includes a transmitter.

Referring to FIG. 11 there is indicated a specific circuit in which the "load" is an embedded transmitter 51. The load includes a micro-miniature wireless FM microphone such as is sold by Herbach and Rademan Company, Mount Laurel, N.J. 08054-1012, in which a buffered wireless microphone operates in a desired frequency range, preferably from 88 MHz to 108 MHz FM, the frequency of any broadcast FM. A combination of a 1 $\mu$f capacitor and a 500$\Omega$ a resistance provides current which is rectified with a 1N 4007 rectifier. An effective filter is provided with a 10 $\mu$f capacitor, an LM317 active filter and a 0.1 $\mu$f capacitor. Feedback to the LM317 is set by 240$\Omega$ and 720$\Omega$ resistors. The filtered current flows to an FM transmitter provided with the microphone and an antenna tuned to the desired frequency. Preferably, a magnetic switch is provided in the 120V AC line to turn the circuit on, or to switch it off, and a LED is connected through a 470$\Omega$ resistor to light up when the switch turns the transmitter on. An essentially similar active cover plate with a transmitter, when installed on a wall receptacle in each room of a house, allows transmissions from any room to be monitored by an FM receiver operating to receive the transmissions.

The circuit components are laid out within a mold in which a plate is molded around the components appropriately wired together, namely a pair of spring-strips positioned to contact terminals of the device; the microphone and transmitter; LED; magnetic leaf switch; 1 $\mu$f capacitor; 0.1 $\mu$f capacitor; 500$\Omega$ resistance; 10 $\mu$f capacitor; 1N 4007 rectifier; 470$\Omega$ resistance; 240$\Omega$ resistance; and, LM317 active filter. Liquid resin is poured over the components and the resin cured. The transmitter is switched on by placing a magnet against the leaf switch. Upon installing the cover plate on a duplex receptacle, the switch is activated and the microphone responds to noises and voices. The transmitter broadcasts somewhere in its frequency range. A standard FM radio is used to find that broadcast signal. Upon finding the signal the transmitter can be tuned to a preferred frequency. The cover plate installed in a baby's bedroom or in the room of a person in ill health now functions to broadcast the sounds from that room whether they are the baby's cries or noises made by the ill person, to a FM radio receiving the sounds in another room.

In an analogous manner, an active plate may be provided with an analogous circuit in which the load is an integrated receiver, except that the components of the circuit will be chosen to match the power requirements of the receiver. The receiver receives a RF signal which originates in a doorbell, smoke alarm, or other device. Reception of the signal activates an alarm of chosen type, such as a flashing light, bell or horn. In either case, the components of the circuit are housed in the cover plate.

Having thus provided a general discussion, described the invention in detail and illustrated it with specific examples of the best mode of making and using it, it will be evident that the active cover plate has provided an effective solution to an old problem. It is therefore to be understood that no undue restrictions are to be imposed by reason of the specific embodiments illustrated and discussed, and particularly that the invention is not restricted to a slavish adherence to the details set forth herein.

I claim:

1. An active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said electrical device after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body.

2. The cover plate means of claim 1 wherein said active load is embedded in said cover plate.

3. The cover plate means of claim 2 includes an electroluminescent panel, and said cover plate means is a translucent synthetic resinous material adapted to electroluminesce upon being connected with a source of potential sufficient to produce electroluminescence.

4. The cover plate means of claim 2 wherein said active load includes a radio transmitter.

5. An active cover plate means for an electrical device including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without removal of said electrical device after it is installed;

each said biasing contact means being in electrical contact with said pair of terminals of an active load including a radio receiver secured to said cover plate means, wherein said load is directly supplied with electrical power through said plate which consumes power, in a manner so as to preclude human contact with a component of said circuit capable of inflicting a shock, said contact means connecting said load to a source of potential without said biasing means being plugged into said body.

6. An active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said standard electrical device after it is installed;

each said biasing contact means being in electrical contact with said pair of terminals of an ultrasonic generator and ultrasonic receiver secured to said cover plate means in a manner so as to preclude human contact with a component of a circuit capable of inflicting a shock, said contact means connecting said load to a source of potential without said biasing means being plugged into said body.

7. An active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said standard electrical device after it is installed;

each said biasing contact means being in electrical contact with said pair of terminals of a light source and a photoelectric sensor secured to said cover plate means in a manner so as to preclude human contact with a component of a circuit capable of inflicting a shock, said contact means connecting said load to a source of potential without said biasing means being plugged into said body.

8. A method of producing an active cover plate means including a receptacle and a cover plate therefor, for use with an electrical device having predetermined specifications including a unit-molded body and terminals, comprising, embedding connecting wires and components of a circuit including an active load within said cover plate so that the load is directly supplied with electrical power through said plate which consumes power; and, securing a pair of oppositely disposed biasing means in electrical contact with said cover plate, said biasing means protruding rearward from said cover plate, said biasing means being adapted to contact said terminals exteriorly of said body without removal of said electrical device after it is installed.

9. The method of claim 8 wherein embedding said components is effected by curing a synthetic resinous material with said components therein.

10. The method of claim 9 wherein said synthetic resinous material is light-transmitting and said active load is an electroluminescent panel.

* * * * *